United States Patent Office 3,156,680
Patented Nov. 10, 1964

3,156,680
PROCESS FOR POLYMERIZING VINYL ETHERS WITH VANADYL OR VANADIC SULFATE CATALYSTS
Michael Dunay, Fanwood, and Herman D. Noether, Short Hills, N.J., assignors to Celanese Corporation of America, New York, N.Y., a corporation of Delaware
No Drawing. Filed Aug. 31, 1960, Ser. No. 53,049
10 Claims. (Cl. 260—91.1)

This invention relates to an improved method of polymerizing vinyl ethers.

It has been proposed to polymerize vinyl ethers to obtain solid polymers. However, such processes have various disadvantages. Thus, organo metallic compounds have often been required which present special handling problems because of their sensitivity to oxygen and moisture, toxicity and inflammability. Moreover, the polymers obtained are often tacky, or if non-tacky solids, have a somewhat low degree of certain properties, e.g. crystallinity and density, which have been found to have an important relation to the performance characteristics of end products such as filaments and unsupported films. The low degree of crystallinity is often manifested by a high degree of solubility of the polymer in solvents such as benzene.

It is an object of this invention to provide an improved process for the polymerization of vinyl ethers. It is a further object of this invention to provide a process of polymerizing vinyl ethers whereby the use of an organo metallic compound as a catalyst component may be avoided. It is a still further object of this invention to provide a process of obtaining vinyl ether polymers of increased crystallinity and density, the increased crystallinity being indicated by a decreased solubility in solvents such as benzene.

In accordance with one aspect of the invention, a vinyl ether either in bulk or dissolved in an organic solvent is contacted with a catalyst comprising a sulfate of vanadium wherein the valence of the vanadium is at least +3 and/or ferric sulfate. It has been found that the use of these compounds often results in vinyl ether polymers having a greater degree of crystallinity, a higher melting point, and a higher density than the polymers heretofore obtained. For example using the catalysts of this invention, it has been found possible to obtain crystalline polymers, e.g. polyvinylisobutyl ether having a melting point above 110° C. and a density above 0.9400 g./cc. Preferably the foregoing vanadium or ferric sulfate is the sole compound of a metal present in the catalyst.

The preferred catalysts are vanadyl sulfate $VOSO_4$, vanadic sulfate $V_2(SO_4)_3$, and ferric sulfate $Fe_2(SO_4)_3$. A suitable range of metal compound of the foregoing type is 0.001 to 5%, preferably 0.01 to 1% based on the weight of monomer.

In some cases, the catalyst may be composed of the foregoing type of metal compound complexed with a compound containing unshared electrons in the outermost shell of a relatively electronegative element such as oxygen, e.g. dialkyl ethers such as diethyl ether, which are well known in the art as forming complexes with compounds of relatively electropositive elements such as boron and the transition metals.

In general the vinyl ethers contemplated are vinyl alkyl or substituted alkyl ethers in which the alkyl groups are straight chain or branched and in which the alkyl or substituted alkyl groups contain from 1 to 20 carbon atoms. Substituents which may be present on the alkyl groups are, for example, halogen e.g. chlorine and bromine, phenyl and alkoxy. Some specific vinyl ethers which may be polymerized using the process of this invention are methyl vinyl ether, ethyl vinyl ether, n-propyl vinyl ether, sec-propyl vinyl ether, isobutyl vinyl ether, n-butyl vinyl ether, sec-butyl vinyl ether, 2-ethylhexyl vinyl ether, 2-methoxyethyl vinyl ether, 2-chloroethyl vinyl ether, diisopropyl methyl vinyl ether, benzyl vinyl ether, vinyl hexyl ether, vinyl octyl ether, vinyl decylether, vinyl tetradecyl ether, vinyl octadecyl ether and divinyl ether of ethylene glycol. The vinyl ether may also be copolymerized with a minor amount of one or more other comonomers.

The polymerization reaction may be carried out for example at a temperature of about −8 to 80° C. Room temperatures and atmospheric pressures may be conveniently used in many instances. As stated previously, the polymerization may be of the monomer in bulk or of the monomer dissolved in an appropriate organic solvent. Where an organic solvent is used the resulting polymer may be either soluble or insoluble in the solvent. If the polymer is insoluble in the solvent it may be filtered from the solvent at the conclusion of the reaction and dried to obtain the solid polymer in particular form. If the polymer is soluble in the organic solvent the resulting polymer solution may be used directly in the formation of shaped articles such as filaments or films, or the solution may be for example spray dried to obtain the polymer in finely divided form. Any convenient concentration of monomer in the solvent at the beginning of the polymerization reaction may be used. Some specific solvents which may be used are for example, benzene, cyclohexane, n-hexane, n-dodecane, pentane, toluene, diethyl ether, methylene chloride, acetic anhydride and 4-methyl pentene-1.

In some cases the process of this invention is a mixture of crystalline polymer and amorphous polymers of varying molecular weights. In this case the crystalline polymer may be separated from the amorphous polymers by mixing the reaction mass with a solvent for the amorphous polymer but in which the crystalline polymer does not dissolve, such as diethyl ether or lower alkanols, e.g. methanol, ethanol and isopropanol. The crystalline polymer may be centrifuged or filtered from the solution of the amorphous polymer in the solvent. To remove the catalyst and further purify the crystalline polymer, the latter may be dissolved in a solvent such as methylene chloride, the catalyst filtered from the solution and the polymer reprecipitated with a non-solvent such as a lower alkanol.

The following examples further illustrate the invention.

Example I

To a sample of vinyl isobutyl ether in a vessel containing air in the vapor space was added dried vanadyl sulfate $VOSO_4$, in an amount of 0.1% based on the weight of the monomer. The polymerization reaction was initiated at 25° C. and allowed to continue for 16 hours while maintaining the temperature below 35° C. The reaction was terminated by mixing the mass with isopropanol in an amount of 300% based on the weight of the original monomer. A crystalline polymer was separated from the mixture by filtration and was dissolved in methylene chloride from which solution the solid catalyst was filtered out. The polymer was reprecipitated by mixing the methylene chloride solution with ethanol and the precipitated polymer was filtered from the solution and air dried. The polymer had a melting point of 120 to 129° C. as determined on a microscope hot stage and was insoluble in benzene. It possessed a large degree of crystallinity as indicated by a sharp X-ray diffraction diagram and was insoluble in isopropanol and benzene.

Example II

The procedure of Example I was repeated except that the catalyst was 0.1% by weight of the monomer of ferric sulfate which was dried in an oven for 5 days at 120° C.

The polymer had a melting point of 120–129° C., was insoluble in benzene and possessed a high degree of crystallinity as indicated by a sharp X-ray diffraction diagram.

*Example III*

The procedure of Example I was repeated except that the vanadyl sulfate was used in an amount of 0.01% based on the weight of the monomer, the reaction time was 72 hours, the crystalline portion of the polymer was initially precipitated with diethyl ether rather than isopropanol and the solution of crystalline polymer in methylene chloride was reprecipitated with methanol rather than ethanol after filtration of the catalyst. The crystalline polymer had a melting point of 120° C., was insoluble in benzene and isopropanol and yielded an X-ray diffraction pattern containing 6 sharp rings.

*Example IV*

The procedure of Example III was repeated except that the polymerization reaction temperature was −8° C. and the reaction period was 1 day. The polymer had a melting point of 129° C., was insoluble in benzene and isopropanol, and yielded an X-ray diffraction pattern containing 6 sharp rings.

*Example V*

The procedure of Examples III and IV was repeated except that the polymerization reaction temperatures was 0° C. and the period of reaction was 3 days. The crystalline polymer had a melting point of 129° C., was insoluble in benzene and isopropanol and yielded an X-ray diffraction diagram containing 8 sharp rings.

*Examples VI to VIII*

The procedure of Example III was repeated except that the monomer was dissolved in a solvent in a weight ratio of solvent to monomer of 1:1, the solvents being diethyl ether, methylene chloride, and n-hexane respectively. Solid polymers were obtained.

*Example IX*

The procedure of Example II was repeated using 0.01% based on the weight of the monomer of ferric sulfate except that the monomer was ethyl vinyl ether instead of isobutyl vinyl ether and the polymer was initially precipitated with ethanol rather than isopropanol. A solid polymer was obtained.

*Example X*

The procedure of Example IX was followed except that the monomer was n-butyl vinyl ether instead of ethyl vinyl ether. A solid polymer was obtained.

*Example XI*

The procedure of Example III was repeated except that the monomer was ethyl vinyl ether instead of isobutyl vinyl ether and the vanadyl sulfate catalyst was used in a concentration of 0.66% based on the weight of the monomer. A solid polymer was obtained.

*Example XII*

The procedure of Example XI was repeated except that the monomer was n-butyl vinyl ether instead of ethyl vinyl ether. A solid polymer was obtained.

*Example XIII*

100 parts by weight of isobutyl vinyl ether were dissolved in 71 parts of diethyl ether in a reaction vessel equipped with stirrer and reflux condenser. While agitating the mass, vanadic sulfate $V_2(SO_4)_3$, was added in an amount of 0.1% based on the weight of the monomer. The reaction was exothermic and cooling was applied to prevent the reaction mass from going above 35° C. After two hours, the precipitated polymer was filtered off and allowed to stand in isopropanol for the purpose of removing catalyst and obtaining a white product. The polymer was filtered free of isopropanol, washed several times with more isopropanol and air dried. The polymer had a relatively high density, i.e. 0.9465 g./cc. and was highly crystalline as indicated by an X-ray diffraction diagram containing 8 sharp rings. The crystalline melting point was also relatively high, i.e., 152–154° C. determined on a microscope hot stage. The polymer could be dissolved in methylene chloride from which solution films could be cast.

The polymers of this invention may be formed into useful filaments, e.g. for the manufacture of textiles, and unsupported films.

It is to be understood that the foregoing detailed description is given merely by way of illustration and that many variations may be made therein without departing from the spirit of our invention.

Having described our invention what we desire to secure by Letters Patent is:

1. A process of polymerizing vinyl ethers having a vinyl group directly bonded to an etheric oxygen atom, wherein the etheric substituents are selected from the group consisting of alkyl, haloalkyl, phenyl alkyl and alkoxy alkyl, having from 1 to 20 carbon atoms, comprising contacting said vinyl ether with 0.001 to 5%, based upon the weight of monomer, of a catalyst comprising at least one member selected from the group consisting of vanadyl sulfate and vanadic sulfate, at a temperature between about −8 to 80° C.

2. The process of claim 1, wherein said vinyl ethers are vinyl alkyl ethers, said alkyl groups having 1 to 20 carbon atoms.

3. A process of polymerizing vinyl ethers having a vinyl group directly bonded to an etheric oxygen atom, wherein the etheric substituents are selected from the group consisting of alkyl, haloalkyl, phenyl alkyl and alkoxy alkyl, having from 1 to 20 carbon atoms comprising contacting said vinyl ether with a catalyst comprising at least one member selected from the group consisting of vanadyl sulfate and vanadic sulfate.

4. A process of polymerizing vinyl ethers having a vinyl group directly bonded to an etheric oxygen atom, wherein the etheric substituents are selected from the group consisting of alkyl, haloalkyl, phenyl alkyl and alkoxy alkyl, having from 1 to 20 carbon atoms comprising contacting said vinyl ether with 0.001 to 5%, based upon the weight of monomer, of a catalyst comprising at least one member selected from the group consisting of vanadyl sulfate and vanadic sulfate.

5. A process for the preparation of solid polyvinylisobutyl ether having a melting point above 110° C. and a density above 0.9400 g./cc. comprising contacting vinyl isobutyl ether with a catalyst comprising at least one member selected from the group consisting of vanadyl sulfate and vanadic sulfate.

6. The process of claim 1, wherein said catalyst is complexed with a dialkyl ether.

7. A process of polymerizing a divinyl ether of an alkylene glycol having from 1 to 20 carbon atoms comprising contacting said divinyl ether with 0.001 to 5%, based upon the weight of monomer of a catalyst comprising at least one member selected from the group consisting of vanadyl sulfate and vanadic sulfate, at a temperature between about −8 to 80° C.

8. The process of claim 7 wherein said alkylene glycol is ethylene glycol.

9. A process of polymerizing in bulk vinyl alkyl ethers having from 1 to 20 carbon atoms comprising contacting said vinyl ether with 0.001 to 5%, based upon the weight of monomer, of a catalyst comprising at least one member selected from the group consisting of vanadyl sulfate and vanadic sulfate, at a temperature between about −8 and 80° C.

10. A process of polymerizing in an inert organic solvent vinyl alkyl ethers having from 1 to 20 carbon atoms comprising contacting said vinyl ether with 0.001 to 5%, based upon the weight of monomer, of a catalyst comprising at least one member selected from the group consisting of vanadyl sulfate and vanadic sulfate, at a temperature between about −8 and 80° C.

References Cited in the file of this patent

UNITED STATES PATENTS

| | | |
|---|---|---|
| 2,616,879 | Zoss | Nov. 4, 1952 |
| 2,984,656 | Lal | May 16, 1961 |
| 3,025,283 | Heck et al. | Mar. 13, 1962 |

FOREIGN PATENTS

| | | |
|---|---|---|
| 571,741 | Italy | Apr. 15, 1958 |

OTHER REFERENCES

J. W. Mellor: Inorganic and Theoretical Chemistry, Longman's Green and Company, New York, New York, volume IX, 1947, page 738.

Schildknecht et al.: Ind. & Eng. Chem., volume 41, No. 9, September 1949, pages 1998–2003.

Natta et al.: Angewandte Chemie, volume 71, #6, pages 205–228, March 21, 1959.